(12) United States Patent
Wu

(10) Patent No.: US 6,790,545 B2
(45) Date of Patent: Sep. 14, 2004

(54) BATTERY HOLDER WITH BATTERY RELEASING MECHANISM

(75) Inventor: Jerry Wu, Pan-Chiao (TW)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 220 days.

(21) Appl. No.: 10/036,222

(22) Filed: Dec. 24, 2001

(65) Prior Publication Data

US 2003/0118875 A1 Jun. 26, 2003

(51) Int. Cl.[7] ................................................ H01M 2/10
(52) U.S. Cl. ........................................ 429/1; 429/100
(58) Field of Search .............................. 429/96, 97, 99, 429/100, 1; 439/500

(56) References Cited

U.S. PATENT DOCUMENTS

| | | | | |
|---|---|---|---|---|
| 5,211,579 A | * | 5/1993 | Seong et al. | 439/500 |
| 5,631,098 A | * | 5/1997 | Suzuki | 429/1 |
| 6,294,286 B1 | * | 9/2001 | Gosior et al. | 429/96 |
| 2002/0045093 A1 | * | 4/2002 | Imamura et al. | 429/96 |

FOREIGN PATENT DOCUMENTS

JP         08-264168 A   *  10/1996

OTHER PUBLICATIONS

JPO English Abstract for JP–08–264168–A (publication date of Oct. 1996).*

* cited by examiner

*Primary Examiner*—Susy Tsang-Foster
(74) *Attorney, Agent, or Firm*—Wei Te Chung

(57) ABSTRACT

A battery holder includes front and rear end blocks connected by opposite side walls, defining an interior space therebetween for receiving a battery having a flat negative terminal and a projected positive terminal on opposite ends. Negative and positive electrodes are attached to inner surfaces of the front and rear end blocks for electrically engaging the negative and positive terminals of the battery. The positive electrode includes a central contact engageable with a free end of the positive terminal and a curved secondary contact for retainingly engaging a circumferential surface of the projected terminal. Two releasing members are positioned under the battery and attached to the positive electrode whereby when the positive electrode is manually disengaged from the positive terminal to release the battery, the releasing members are forced to drive the battery out of the holder thereby automatically ejecting the battery out of the holder.

20 Claims, 7 Drawing Sheets

BATTERY HOLDER WITH BATTERY RELEASING MECHANISM

BACKGROUND OF THE INVENTION

1. Field of the Invention

The present invention generally relates to a battery holder for holding and mounting a dry battery to for example a circuit board, and more particular to a battery holder having a mechanism for releasing a battery from the holder.

2. The Related Arts

A battery holder receives and retains a dry battery, such as "A", "AA", "½AA", and "AAA" size batteries, comprising a cylindrical body having a first flat end surface, serving as a negative terminal, and a second end surface from which a cylinder concentrically projects, serving as a positive terminal. The battery holder is equipped with positive and negative electrodes that electrically and respectively engage with positive and negative terminals of the battery for routing the electricity from the battery to a power consuming device to which the electrodes of the holder are connected. Batteries of this type are sometimes adapted as backup power supply in a computer system. In that case, the positive and negative electrodes of the battery holder are electrically connected to a main circuit board of the computer system.

Heretofore, a battery is often removed from the battery holder by means an additional slender tool, such as a screwdriver, having a tip inserted into a very small space between a wall of the holder and the battery body. Very often, a great force is required to "dig" the battery out of the holder. This is of particular concern in a personal computer system wherein a space inside the computer system is very limited and thus preventing such an operation. In addition, conventional battery holder requires an additional cover to help securing a battery in the battery holder. This increases costs.

Thus, a more effective and efficient way to hold and remove a battery in and out of a battery holder of the kind previously discussed is desired.

SUMMARY OF THE INVENTION

Accordingly, an object of the present invention is to provide a battery holder that allows a battery to be readily removed from the holder.

Another object of the present invention is to provide a battery holder comprising a battery releasing mechanism for automatic ejection of the battery out of the holder during a battery releasing operation.

A further object of the present invention is to provide a battery holder comprising a positive electrode having a dual contact structure.

A further object of the present invention is to provide a battery holder comprising a positive electrode which, beside electrically engaging a cylindrical positive terminal of a battery, mechanically and retainingly engaging the positive terminal to secure the battery in the battery holder.

Yet a further object of the present invention is to provide a battery holder which effectively prevents a battery from positioned in the holder in an incorrect orientation.

Yet a further object of the present invention is to provide a battery holder that holds a battery without an additional cover so as to reduce costs.

To achieve the above objects, in accordance with the present invention, a battery holder comprises front and rear end blocks connected by opposite side walls, defining an interior space therebetween for receiving a battery having a flat negative terminal and a reduced positive terminal on opposite ends. Negative and positive electrodes are attached to inner surfaces of the front and rear end blocks for electrically engaging the negative and positive terminals of the battery. Flanges are formed on the inner surface of the front end block for holding the negative terminal side of the battery. Opposite raised portions are formed on the inner surface of the rear end block defining a channel for receiving the positive electrode. The channel is sized only to accommodate the reduced positive terminal so as to prevent the battery to be positioned in an incorrect orientation. The positive electrode comprises a central contact engageable with a free end of the positive terminal and an inverted U-shaped secondary contact for retainingly engaging a circumferential surface of the reduced terminal for both electrical connection therewith and mechanically retaining the battery at the positive terminal side. Two releasing members are positioned under the battery and attached to the secondary contact whereby when the secondary contact is manually disengaged from the reduced positive terminal to release the battery, the releasing members are forced to drive the battery out of the holder thereby automatically ejecting the battery out of the holder.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
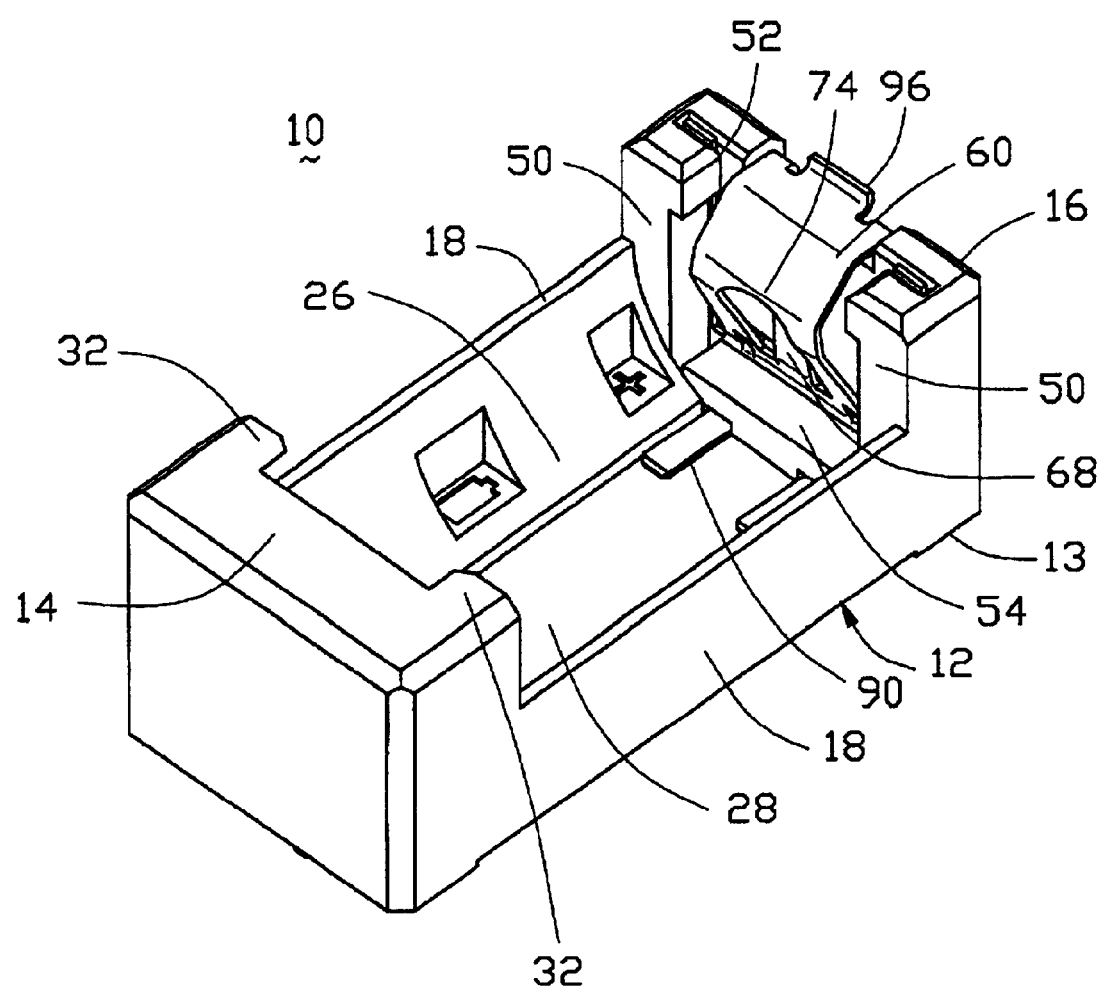
FIG. 1 is a perspective view of a battery holder constructed in accordance with the present invention observed from top-front side thereof.
Figure 2:
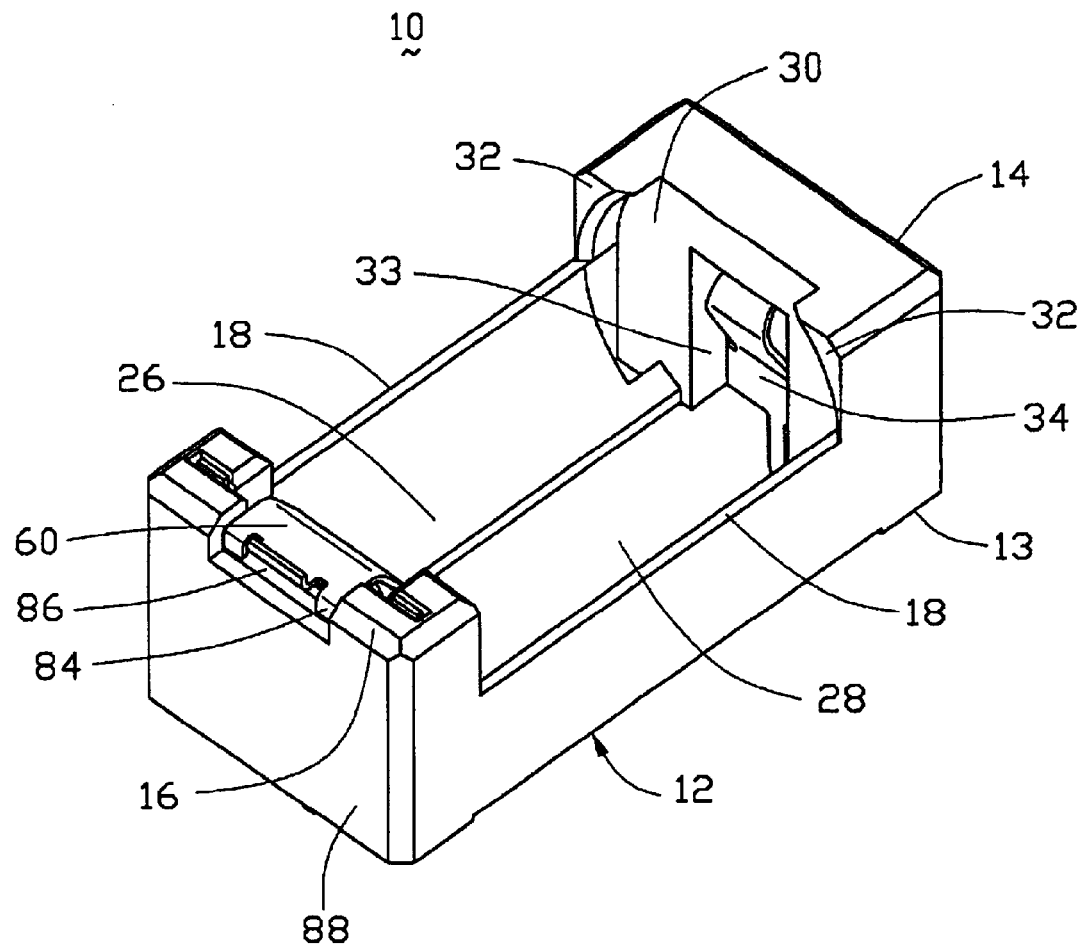
FIG. 2 is another perspective view of the battery holder of the present invention taken from a top-rear side thereof.
Figure 3:
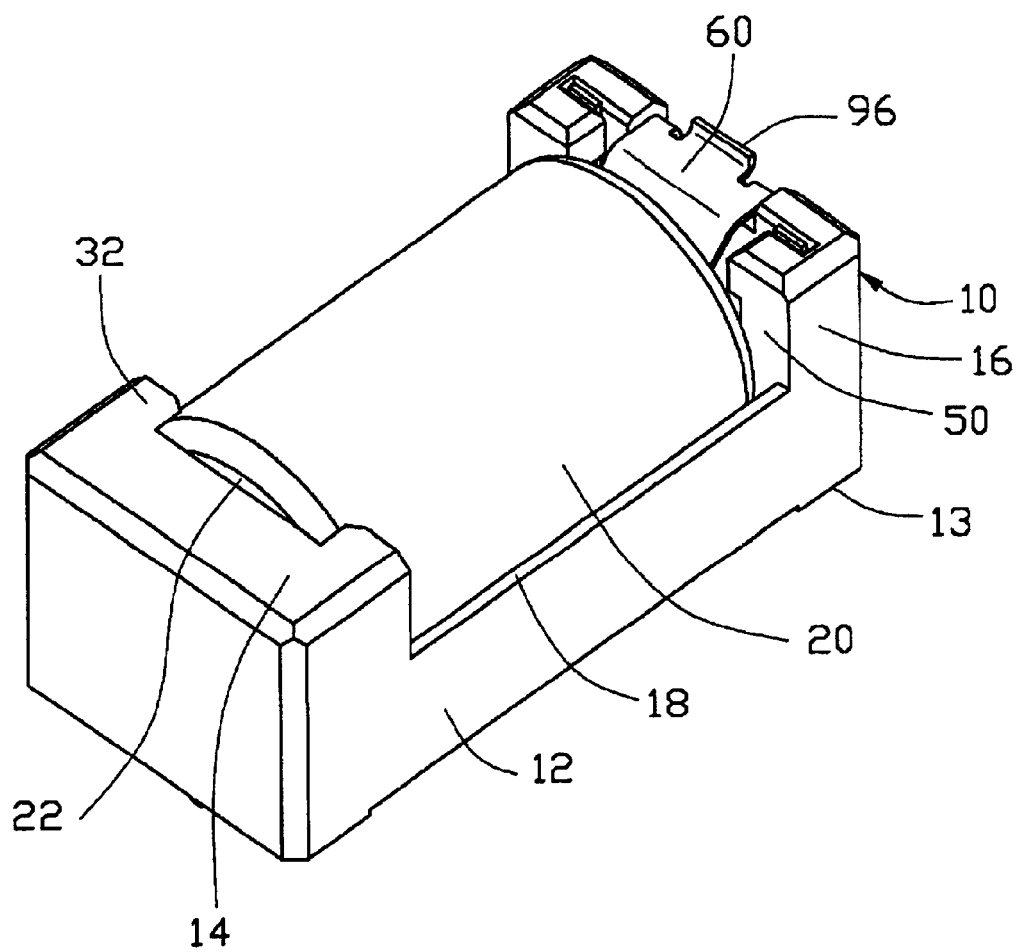
FIG. 3 is a perspective view similar to FIG. 1 with a battery received in the battery holder.
Figure 4:
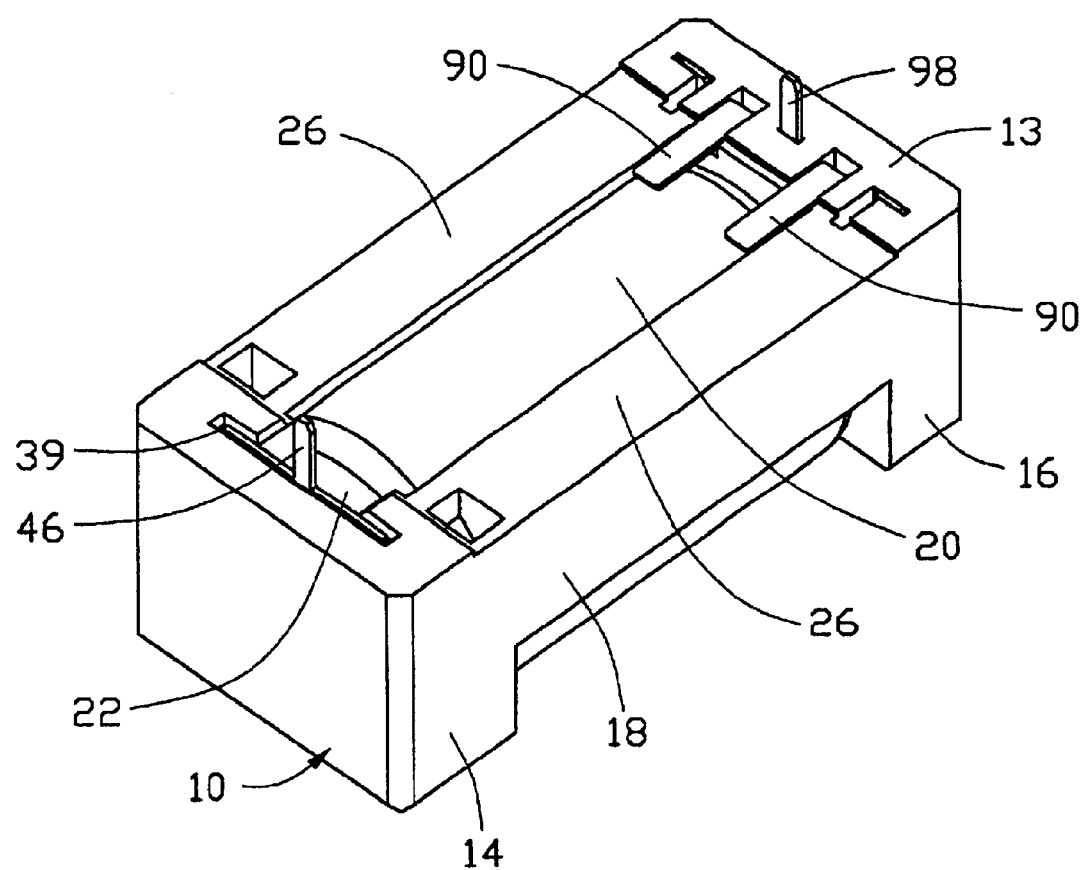
FIG. 4 is a further perspective view of the battery holder of the present invention taken from a bottom-front side with the battery received therein.

With reference to the drawings and in particular to FIGS. 1–4, a battery holder constructed in accordance with the present invention, generally designated with reference numeral 10, comprises a body 12, preferably made of insulation material, having a bottom surface 13 adapted to be positioned on a circuit board (not shown). The body 12 comprises front and rear end blocks 14, 16 connected by two opposite side walls 18 whereby an interior space (not labeled) having a top opening is defined between the side walls 18 for receipt of a battery 20 having a cylindrical body (not labeled) and opposite end surfaces respectively forming a flat negative terminal 22 and a cylindrical positive terminal 24 (both see FIG. 7) that has a reduced diameter and concentrically projects from the end surface. Each side wall 18 has an inward-extending bottom flange 26 for supporting the battery 20 in the holder body 12. The bottom flanges 26 of the side walls 18 are spaced from each other, defining a bottom opening 28 which will be further discussed.

Figure 5:
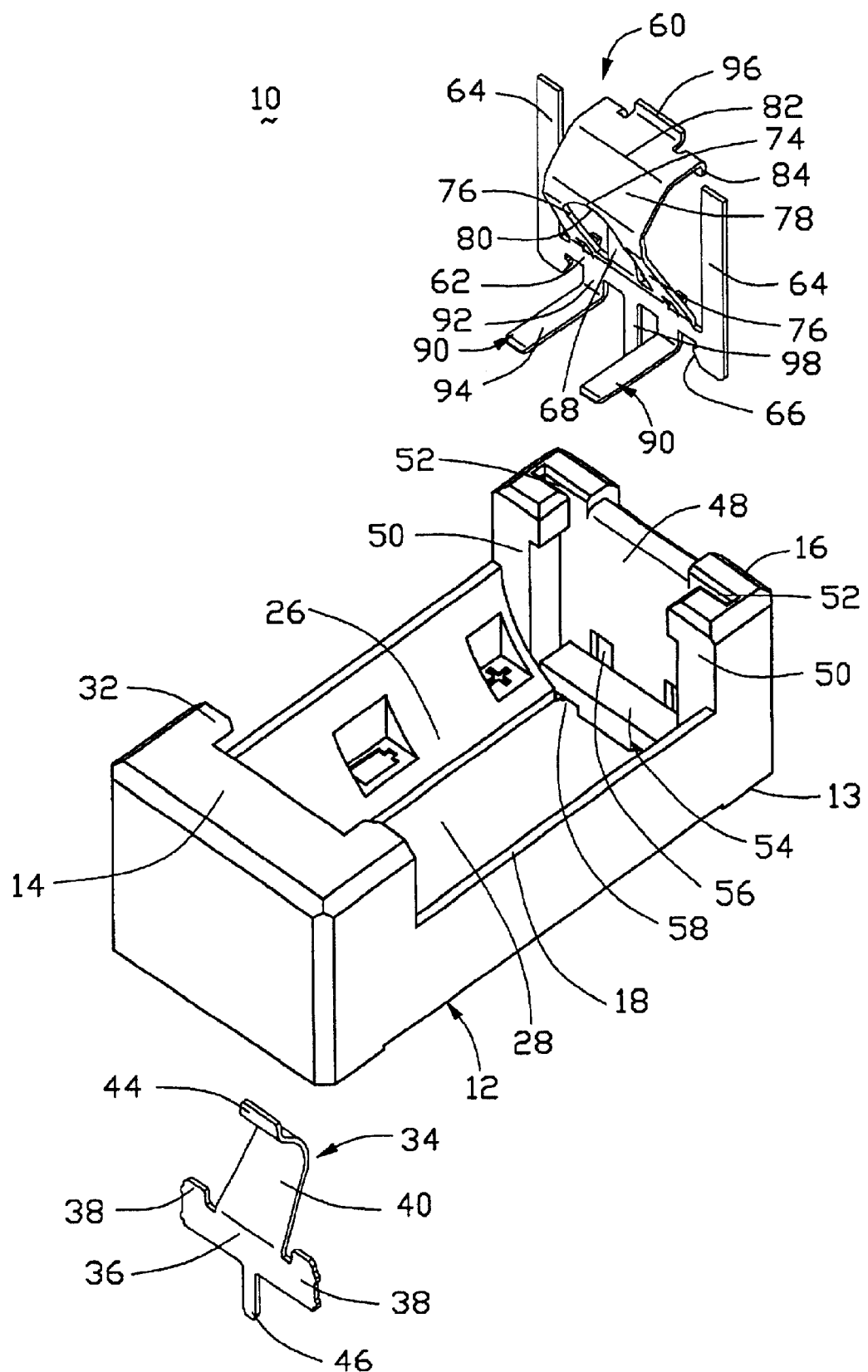
FIG. 5 is an exploded view of the battery holder of the present invention taken from the top-front side.
Figure 6:
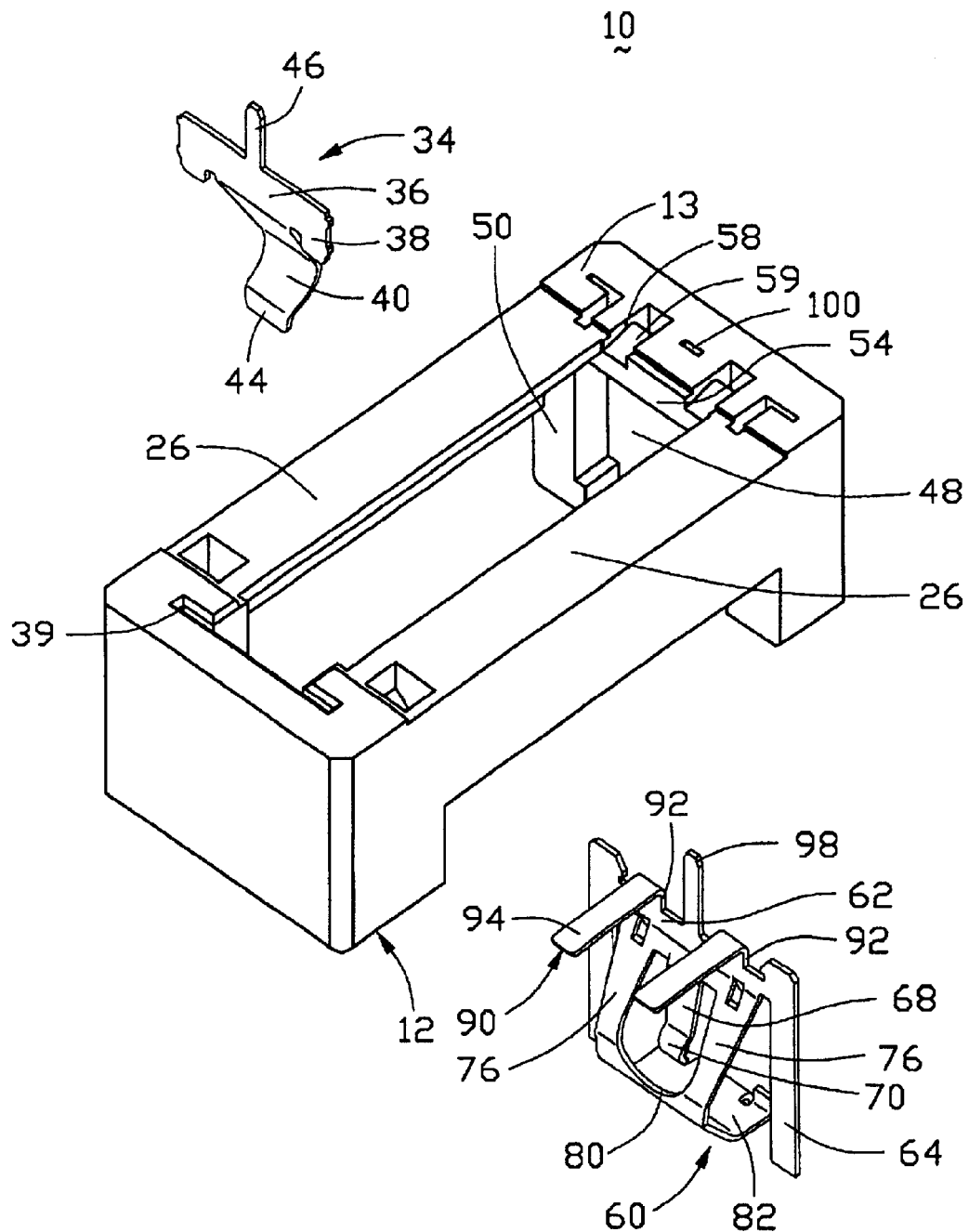
FIG. 6 is another exploded view of the battery holder of the present invention taken from the bottom-front side.

Also referring to FIGS. 5 and 6, the front end block 14 has an inner surface 30 against which the flat negative terminal 22 of the battery 20 abuts. Two spaced arc flanges 32 extend from the inner surface 30 of the front end block 14 and confront the rear end block 16 for retaining the negative end side of the battery 20 by engaging a circumferential cylindrical surface of the battery 20 proximate the negative terminal 22. An elongate recess 33 is defined in the inner surface 30 of the front end block 14. A first conductive blade 34, serving as a negative electrode of the battery holder 10, is received in the recess 33 and electrically engages the negative terminal 22 of the battery 20.

The negative electrode blade 34 comprises a base section 36 having opposite, barbed edges 38 interferentially received in slits 39 defined in a bottom surface 13 of the holder body 12 thereby securing the negative electrode blade 34 in the recess 33. A spring arm 40, in a convex shape, extends from the base section 36 and substantially runs along the elongate recess 33. A stopper 42 is formed in the recess 33 and spaced from a bottom of the recess 33 for movably accommodating a free end 44 of the spring arm 40 therebetween. The stopper 42 engages and limits the free end 44 of the spring arm 40 from leaving the recess 33. The convex configuration of the spring arm 40 allows the spring arm 40 to be contacted and deformed by the negative terminal 22 of the battery 20 and the resilient force of the spring arm 40, after being deformed, ensures a positive engagement between the negative terminal 22 of the battery 20 and the negative electrode blade 34.

A soldering tail 46 extends from the base section 36 of the negative electrode blade 34 in a direction substantially opposite to the spring arm 40. The soldering tail 46 projects beyond the bottom surface 13 of the holder body 12 for being soldered to the circuit board (not shown).

The rear end block 16 of the holder body 12 has an inner surface 48 on which two opposite raised portions 50 are formed, defining a receiving space (not labeled) therebetween. A slit 52 is formed between each raised portion 50 and the inner surface 48 of the rear end block 16. A cross bar 54 extends between the raised portions 50 and straddles between the bottom flanges 26 of the side walls 18 of the holder body 12. Two channels 56 are defined in the inner surface 48 of the rear end block 16. A groove 58 is defined in a bottom side of the cross bar 54 and extends between each channel 56 and the bottom opening 28 of the holder body 12. Each groove 58 has an inclined bottom 59 diverging from the bottom surface 13 of the holder body 12 as the groove 58 extends away from the channel 56.

A second conductive blade 60, serving as a positive electrode of the battery holder 10, is received in the receiving space between the raised portions 50 of the rear end block 16. The positive electrode blade 60 comprises a base section 62 and two retention sections 64 formed on opposite sides of the base section 62. The retention sections 64 are received in the slits 52 of the rear end block 16 for properly positioning the positive electrode blade 60 in the receiving space. Each retention section 64 has a barbed edge 66 interferentially engaging with the slit 52 to secure the positive electrode blade 60 in the receiving space.

Figure 7:
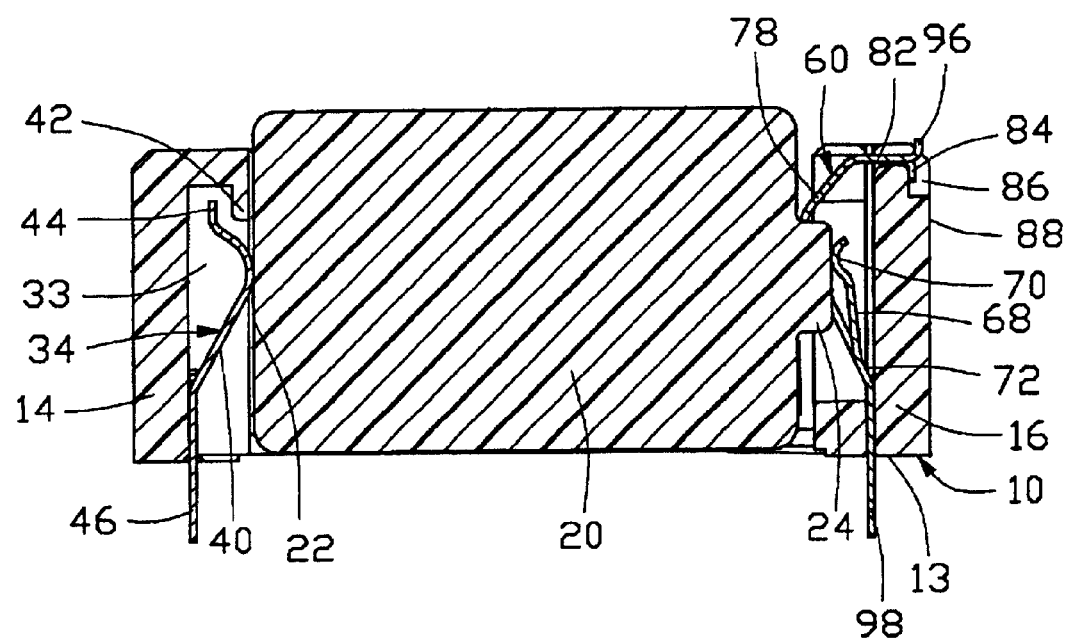
FIG. 7 is a cross-sectional view of the battery holder taken along line 7—7 of FIG. 3.

A central contact 68 extends from the base section 62, as a cantilever beam, substantially midway between the retention sections 64 and forms a convex end 70 for engaging a free end face (not labeled) of the cylindrical positive terminal 24 of the battery 20. The central contact 68 is preferably provided with a bend 72 for resiliently engaging the convex end 70 with the positive terminal 24 of the battery 20. A secondary contact 74, having an inverted U-shape, comprises two limbs 76 located on opposite sides of the central contact 68 and extending from the base section 62. A connection portion 78 connects between the limbs 76 whereby an arc portion 80 is formed along an edge of the connection portion 78. The secondary contact 74 has generally a convex configuration projecting beyond the raised portions 50 into the interior space of the holder body 12 with the arc portion 80 at the outermost position. The arc portion 80 engages a circumferential surface (not labeled) of the positive terminal 24 of the battery 20 as shown in FIG. 7, functioning as both an electrical contact of the positive terminal 24 of the battery 20 and a mechanical retention means for the battery 20.

The connection portion 78 forms an inclined surface with respect to an insertion direction of the battery 20 for guiding the positive terminal 24 of the battery 20 into retaining engagement with the arc portion 80. The connection portion 78 also forms an extension 82 having perpendicular tabs 84 engageable with notches 86 defined in an outer surface 88 of the rear end block 16 for retaining the secondary contact 74 in position.

Two releasing members 90 are attached to the base section 62. Each releasing member 90 comprises a root section 92 extending from the base section 62 in a direction substantially opposite to the central contact 68 and the secondary contact 74 and through each channel 56 and a driver section 94 extending from a free end of the root section 92 substantially perpendicularly whereby the driver section 94 runs substantially along the inclined bottom 59 of the groove 58. The base section 62 is dimensioned to be forcibly rotatable to swingingly move the driver section 94 within the groove 58 from the initial position where the driver section 94 substantially overlaps the inclined bottom 59 of the groove 58 and a final position where the driver section 94 is moved away from the bottom 59 of the groove 58 and substantially flush with the bottom surface 13 of the holder body 12.

The grooves 58 are in communication with the bottom opening 28. The driver sections 94 of the releasing members 90 are substantially longer than the grooves 58 whereby the driver sections 94 extend through the bottom opening 28 into the interior space of the holder body 12. When the battery 20 is put into the holder 10, the positive terminal 24 of the battery 20 contacts and biases the secondary contact 74 of the positive electrode blade 60 in such a way to force the driver sections 94 of the releasing members 90 to closely overlap the inclined bottoms 59 of the grooves 58. As the battery 20 moves toward the bottom flanges 26 of the side walls 18 of the holder body 12, the cylindrical body of the battery 20 eventually contacts and forces the driver sections 94 toward the final position. The arc portion 80 of the connection portion 78 retainingly engages the positive terminal 24 of the battery 20 at the same time the driver sections 94 are forced toward the final position. The battery 20 that is completely received in the interior space of the battery holder 10 maintains the driver sections 94 in the final position which in turn ensures the positive engagement of the secondary contact 74 with the positive terminal 24 of the battery 20.

To release the battery 20 from the battery holder 10, the secondary contact 74 of the positive electrode blade 60 is manually deformed/moved to disengage the arc portion 80 from the positive terminal 24 of the battery 20. At the same time, due to the deformation/rotation of the base section 62 caused by the deformation/movement of the secondary contact 74, the driver sections 94 force the battery 20 to move away from the bottom flanges 26 of the side walls 18 and eventually ejecting the battery 20 out of the holder 10.

A manual operation tab 96 is formed on the extension 82 of the connection portion 78 of the positive electrode blade 60 for facilitating manual operation of the secondary contact 74 in releasing the battery 20.

A soldering tail 98 extends from the base section 62 of the positive electrode blade 60, substantially midway between the releasing members 90. The soldering tail 98 extends though a hole 100 defined in the bottom surface 13 of the holder body 12 for being soldered to the circuit board.

It is noted that the receiving space defined between the raised portions 50 of the rear block is sized to accommodate movement of the reduced positive terminal 24 of the battery 20, while not able to take the negative terminal 22. The distance between the inner surfaces 30, 48 of the front and rear end blocks 14, 16 are substantially corresponding to an overall length of the battery 20 (namely the dimension between the end surfaces of the battery 20 plus a length of the positive terminal 24), while the distance between the inner surface 30 of the front end block 14 and the raised portions 50 of the rear end block 16 is corresponding to a length of the cylindrical body of the battery 20 (namely, the dimension between the end surfaces of the battery 20). This prevents the battery 20 from being put into the battery holder 10 in an incorrect orientation.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A battery holder adapted to retain a battery having opposite first and second end faces, the first end face forming a first electrical terminal of the battery, a projection extending from the second end face to form a second electrical terminal of the battery, the battery holder comprising:
   a body having opposite first and second end blocks connected by opposite side walls defining an interior space for receiving a battery, the first and second end blocks respectively having first and second inner surfaces facing each other;
   a first electrode blade attached to the first inner surface and having a tail extending beyond the holder body, the first electrode blade being adapted to engage a first electrical terminal of the battery; and
   a second electrode blade attached to the second inner surface and having a tail extending beyond the holder body, the second electrode blade being adapted to engage a second electrical terminal of the battery;
   wherein the second electrode blade comprises a central contact engageable with an end face of the second electrical terminal of the battery and a secondary contact curvedly projecting toward the interior space and comprising two spaced limbs connected by a connection portion, the connection portion being adapted to engage a circumferential surface of the second electrical terminal of the battery for electrical connection with the second electrical terminal and mechanically retaining the battery in the battery holder.

2. The battery holder as claimed in claim 1, wherein the secondary contact comprises a portion inclined with respect to an insertion direction of the battery for guiding the second electrical terminal into retaining engagement with the connection portion of the secondary contact.

3. The battery holder as claimed in claim 1, wherein the secondary contact forms a manual tab for manually disengaging the connection portion of the secondary contact from the second electrical terminal of the battery.

4. The battery holder as claimed in claim 1, wherein the secondary contact comprises at least one retention tab engageable with a corresponding notch defined in the second end block of the holder body.

5. The battery holder as claimed in claim 1, wherein the secondary contact comprises an extension from the connection portion, the extension forming two retention tabs engageable with notches defined in the second end block of the holder body and a manual tab for manual operation to release the connection portion of the secondary contact from the second electrical terminal of the battery.

6. The battery holder as claimed in claim 5, wherein the extension of the connection portion of the secondary contact forms an inclined surface for guiding the second electrode blade of the battery into retaining engagement with the connection portion of the secondary contact.

7. The battery holder as claimed in claim 1, wherein the second electrode blade comprises a base section from which the central contact and the limbs of the secondary contact extend, two retention sections are formed on opposite sides of the base section and interferentially received in slits defined in the second end block for attaching the second electrode blade to the second end block.

8. The battery holder as claimed in claim 7, wherein the second electrode blade further comprises a releasing member attached to the base section, the releasing member comprising a driver section extending into the interior space and adapted to be abuttingly engaged by the battery whereby when the connection portion manually disengages from the second electrical terminal of the battery, the base section is deformed, causing the driver section to move in a direction to force the battery away from the holder.

9. The battery holder as claimed in claim 1, wherein the secondary contact is manually operable to disengage from the second electrical terminal of the battery and wherein the second electrode blade further comprises a releasing member coupled to the secondary contact, the releasing member having a driver section in physical engagement with the battery whereby when the secondary contact is manually operated to disengage from the second electrical terminal of the battery, the driver section is simultaneously caused to drive the battery in a direction to release the battery from the holder.

10. The battery holder as claimed in claim 1, wherein at least one flange projects from the first inner surface for retainingly engaging a circumferential surface of the battery.

11. The battery holder as claimed in claim 1, wherein the first end block defines a recess in the first inner surface for accommodating the first electrode blade, the first electrode blade comprising a convex spring arm projecting beyond the first inner surface and into the interior space for engaging the first electrical terminal of the battery.

12. The battery holder as claimed in claim 11, wherein the first end block forms a stopper engageable with a free end of the spring arm for retaining the spring arm.

13. The battery holder as claimed in claim 9, wherein a cross bar extends between the side walls, a groove being defined in a bottom of the cross bar and in communication with the interior space of the holder body, the groove having a bottom inclined with respect to and diverging from a bottom surface of the holder body, the driver section being received in the groove and swingingly movable from a first position separated from the bottom of the groove to a second position substantially overlapping the bottom of the groove to drive the battery out of the holder body.

14. The battery holder as claimed in claim 1, wherein the two raised portions are formed on the second inner surface to define therebetween a receiving space in which the second electrode blade is received, the receiving space being sized to accommodate the projection of the second electrical terminal of the battery, but not the first electrical terminal, and wherein a distance between the first inner surface and the raised portions is larger than a distance between the end faces of the battery and smaller than a distance between the first end face and a free end of the second electrical terminal of the battery whereby the battery is prevented from being positioned in the interior space in an incorrect orientation.

15. The battery holder as claimed in claim 1, wherein the second electrode blade comprises an additional section extending from in a direction substantially perpendicular to the secondary contact, the secondary contact comprising a convex portion whereby when the battery is positioned in the interior space of the holder, the additional section is in depressed engagement with the battery, leading to a driving force of the secondary contact against the battery.

16. A battery holder comprising a holder body having front and rear end walls defining therebetween an interior space adapted to receive a battery having opposite front and rear terminals, front and rear electrodes being attached to the front and rear end walls for electrically engaging the terminals of the battery, the rear electrode comprising a first section curvedly projecting toward the interior space which is adapted to engage a circumferential surface of a projection of the rear terminal and thus retaining the battery in the interior space and a second section which is adapted to underlay the battery, the rear electrode being angularly movable to an unlocked position to disengage the rear terminal and simultaneously drive the battery out of the interior space by the second section.

17. The battery holder as claimed in claim 16, wherein the front end wall forms flanges for cooperating with the first section of the rear electrode to secure the battery in the holder body.

18. A battery holder assembly comprising:
a holder body including front and rear end walls commonly defining therebetween an interior space communicating with an exterior space;
front and rear electrodes being disposed around the front and rear end walls; and
a battery received in said interior space and having opposite front and rear end faces, the front end face forming a front terminal and a projection extending from the rear end face forming a rear terminal, the front and rear terminals respectively mechanically and electrically engaged with the front and rear electrodes, the rear terminal being diametrically smaller than the front terminal; wherein
a pressing member located around said rear end wall, releasably presses against said battery in an inserting direction of the battery for retaining the battery in said interior space, while a releasing member located around said rear end wall urges said battery to move away from the interior space in a direction opposite to the inserting direction of the battery.

19. The assembly as claimed in claim 18, wherein said pressing member presses against said projection.

20. A battery holder assembly comprising:
a holder body including front and rear end walls with front and rear electrodes thereof;
a battery defining a column body with opposite front and rear end faces and having a flat terminal on said front end face and a projected terminal formed on said rear end face, the projected terminal being diametrically smaller than the flat terminal;
two spaced arc flanges formed on the front end wail, a space formed under said two spaced arc flanges being adapted to receive said column body;
two opposite raised portions being formed on the rear end walls, another space formed under said two opposite raised portions being adapted to receive said projected terminal but not said column body; and
a distance between said two spaced arc flanges and said two opposite raised portions along an axial direction of said holder body being smaller than that between said front mid rear end faces; wherein
said battery is only allowed to be installed into the holder body with the flat terminal engaged with the front electrode and the projected terminal engaged with the rear electrode under a condition that a front portion of the column body of said battery with the flat terminal is received in said space and the projected terminal is received in said another space.

* * * * *